(12) United States Patent
Zelenka et al.

(10) Patent No.: US 7,007,047 B2
(45) Date of Patent: Feb. 28, 2006

(54) INTERNALLY CONSISTENT FILE SYSTEM IMAGE IN DISTRIBUTED OBJECT-BASED DATA STORAGE

(75) Inventors: James D. Zelenka, Pittsburgh, PA (US); Mark C. Holland, Pittsburgh, PA (US)

(73) Assignee: Panasas, Inc., Pittsburgh, PA (US)

( * ) Notice: Subject to any disclaimer, the term of this patent is extended or adjusted under 35 U.S.C. 154(b) by 530 days.

(21) Appl. No.: 10/273,945

(22) Filed: Oct. 18, 2002

(65) Prior Publication Data

US 2003/0187883 A1 Oct. 2, 2003

Related U.S. Application Data

(60) Provisional application No. 60/372,027, filed on Apr. 12, 2002, provisional application No. 60/368,785, filed on Mar. 29, 2002.

(51) Int. Cl.
G06F 17/30 (2006.01)

(52) U.S. Cl. .......................... 707/204; 709/226; 709/9; 707/202; 707/201

(58) Field of Classification Search ................ 707/204, 707/202, 201; 709/226, 9
See application file for complete search history.

(56) References Cited

U.S. PATENT DOCUMENTS

| | | | |
|---|---|---|---|
| 5,303,379 A | 4/1994 | Khoyi et al. ................ 395/700 |
| 5,634,124 A | 5/1997 | Khoyi et al. ................ 395/614 |
| 5,680,619 A * | 10/1997 | Gudmundson et al. ..... 717/108 |
| 5,764,877 A | 6/1998 | Lomet et al. .......... 395/182.04 |
| 5,845,082 A | 12/1998 | Murakami ............. 395/200.56 |
| 5,946,686 A | 8/1999 | Schmuck et al. ............. 707/10 |
| 5,956,713 A | 9/1999 | Bamford et al. ............... 707/8 |
| 5,956,734 A | 9/1999 | Schmuck et al. ........... 707/205 |
| 5,960,446 A | 9/1999 | Schmuck et al. ........... 707/205 |
| 5,987,477 A | 11/1999 | Schmuck et al. ........... 707/201 |
| 5,991,763 A | 11/1999 | Long et al. ................. 707/101 |
| 5,999,179 A * | 12/1999 | Kekic et al. ................ 715/734 |
| 6,014,651 A * | 1/2000 | Crawford .................... 705/400 |
| 6,023,706 A | 2/2000 | Schmuck et al. ........... 707/200 |
| 6,128,621 A | 10/2000 | Weisz ......................... 707/103 |
| 6,135,646 A * | 10/2000 | Kahn et al. ................. 709/217 |

(Continued)

OTHER PUBLICATIONS

Article by Garth A. Gibson et al. entitled "A Cost-Effective, High-Bandwidth Storage Architecture", pp. 92-103, Association for Computing Machinery, 1998.

(Continued)

Primary Examiner—Wayne Amsbury
(74) Attorney, Agent, or Firm—Morgan, Lewis & Bockius LLP

(57) ABSTRACT

A system and method to perform a system-wide file system image without time smear in a distributed object-based data storage system. A realm manager is elected as an image master using the Distributed Consensus Algorithm to execute image-taking. All pending write capabilities are invalidated prior to taking the system-wide file system image so as to quiesce the realm and prepare the storage system for the system-wide image. Once the system is quiesced, the image master instructs each storage manager in the system to clone each live object group contained therein without explicitly cloning any objects contained in such object group. In one embodiment, a file manager copies an object in the system before a write operation is performed on that object after the image is taken. Neither the cloning operation nor the copying operation update any directory objects in the system. At run time, a client application may use a mapping scheme to access objects contained in the system-wide image.

32 Claims, 7 Drawing Sheets

U.S. PATENT DOCUMENTS

| | | | |
|---|---|---|---|
| 6,233,623 B1 | 5/2001 | Jeffords et al. | 709/316 |
| 6,850,893 B1 * | 2/2005 | Lipkin et al. | 705/8 |
| 2002/0107945 A1 * | 8/2002 | George et al. | 709/222 |
| 2002/0161889 A1 * | 10/2002 | Gamache et al. | 709/226 |
| 2002/0174168 A1 * | 11/2002 | Beukema et al. | 709/201 |

OTHER PUBLICATIONS

Article by Yehuda Afek et al. entitled "Atomic Snapshots of Shared Memory," pp. 1-13, Association for Computing Machinery, 1990.

Article by Garth A. Gibson and Rodney Van Meter entitled "Network Attached Storage Architecture", pp. 37-45, Communications of the ACM, Nov. 2000, vol. 43, No. 11.

Article by Andreas Dilger & Peter J. Braam entitled "Object Based Storage HOWTO", pp. 1-13, Version 2, Dec. 23, 1999, available at http://www.lustre.org/docs.

Article by Leslie Lamport entitled "The Part-Time Parliament," pp. i-vi, 1-42, Digital Equipment Corporation, Sep. 1, 1989.

* cited by examiner

| Device (device_ID) |
|---|
| Object Group (object-group_ID) |
| Object (object_ID) |
FIG. 12
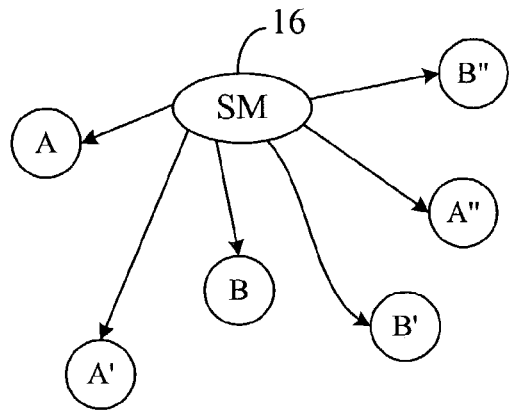
FIG. 13
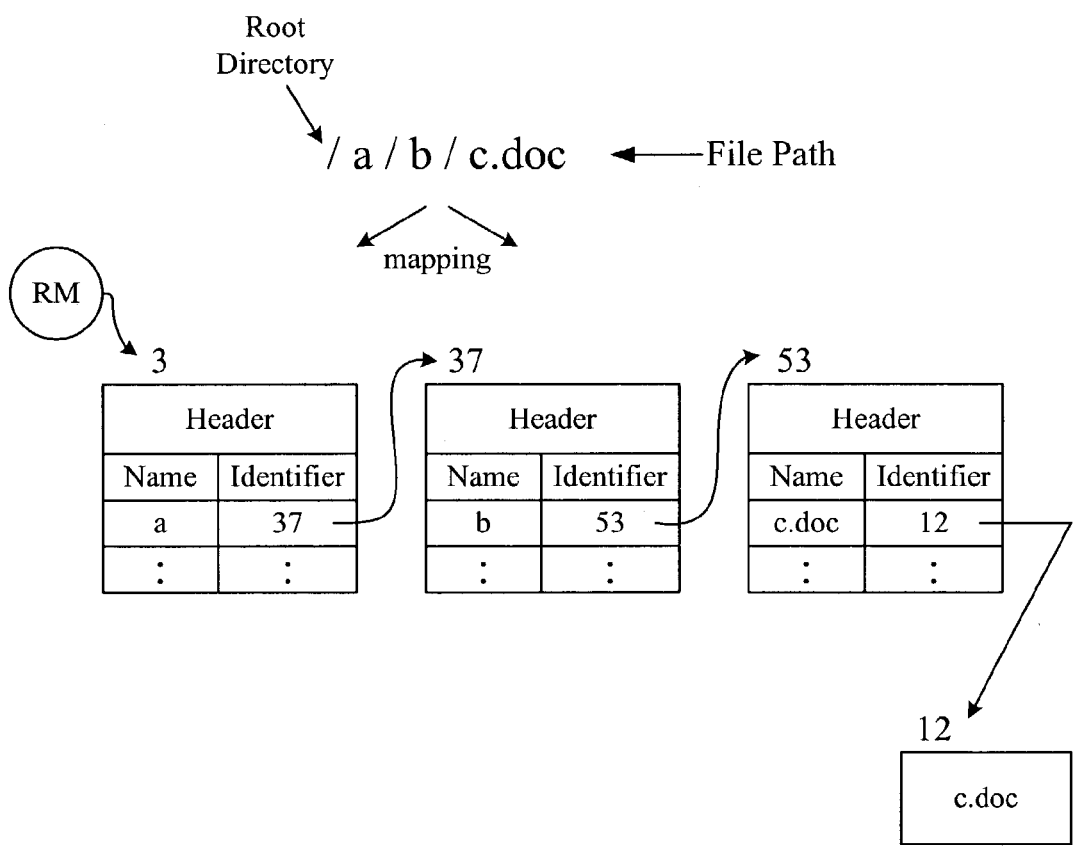
FIG. 14

| File Path | Triplets | Live Domain | Image Domain |
|---|---|---|---|
| / | device_ID<br>object-group_ID<br>object_ID | $\alpha$<br>A<br>3 | $\alpha$<br>A'<br>3 |
| a | device_ID<br>object-group_ID<br>object_ID | $\alpha$<br>B<br>37 | $\alpha$<br>B'<br>37 |
| b | device_ID<br>object-group_ID<br>object_ID | $\alpha$<br>C<br>53 | $\alpha$<br>C'<br>53 |
| c.doc | device_ID<br>object-group_ID<br>object_ID | $\alpha$<br>B<br>12 | $\alpha$<br>B'<br>12 |

FIG. 15

INTERNALLY CONSISTENT FILE SYSTEM IMAGE IN DISTRIBUTED OBJECT-BASED DATA STORAGE

REFERENCE TO RELATED APPLICATIONS

This application claims priority benefits of prior filed co-pending U.S. provisional patent applications Ser. No. 60/368,785, filed on Mar. 29, 2002 and Ser. No. 60/372,027, filed on Apr. 12, 2002, the disclosures of both of which are incorporated herein by reference in their entireties.

BACKGROUND

1. Field of the Invention

The present invention generally relates to data storage systems and methods, and, more particularly, to methodologies for internally consistent system-wide file system image in a distributed object-based data storage system.

2. Description of Related Art

With increasing reliance on electronic means of data communication, different models to efficiently and economically store a large amount of data have been proposed. A data storage mechanism requires not only a sufficient amount of physical disk space to store data, but various levels of fault tolerance or redundancy (depending on how critical the data is) to preserve data integrity in the event of one or more disk failures. One way of providing fault tolerance is to periodically take images or copies of various files stored in the data storage system to thereby store the file data for recovery purposes in the event that a disk failure occurs in the system. Thus, imaging is useful in facilitating system backups and related data integrity maintenance activity.

The term "image", as used hereinbelow, refers to an immutable image or "copy" of some or all content of the file system at some point in time. Further, an image is said to be "internally consistent" or "crash consistent" if it logically occurs at a point in time at which no write activity is occurring anywhere in the data storage system. This guarantees that no files are left in an inconsistent state because of in-flight writes. On the other hand, an image is said to be "externally consistent" if the file system interacts with an external application program to assure that the external program is at a point from which it can be restarted, and flushed all of its buffers to storage, prior to taking the image. Both internal and external consistencies are desirable in order to guarantee that an image represents data from which an application can be reliably restarted.

The term "time smear" as used herein refers to an event where an image of the files in a distributed file processing system is not consistent with regard to the time that each piece of data was copied. In other words, "time smear" is the name for the effect of having two files in the image, wherein the contents of file A represent file A's state at some time $T_0$, and the contents of file B represent file B's state at some other time $T_1 \neq T_0$. Such time smear in the images of different data files may occur when the data files are stored at different storage locations (or disks) and the server taking the image accesses, for example, separate data storage facilities consecutively over a period of time. For example, an image of a first data file in a first data storage facility may be taken at midnight, whereas an image of a second data file in a second data storage facility may be taken at one second after midnight, an image of a third data file in a third data storage facility may be taken at two seconds after midnight, and so on.

Another adverse result of time smear occurs when a single data file is saved on multiple machines or storage disks. In such a situation, if a save operation occurs nearly simultaneously with the image-taking operation, portions of the information contained in the image may correspond to different saved versions of the same file. If that file is then recovered from the image, the recovered file may not be usable because it contains data from different saves, resulting in inconsistent data and causing the file to be potentially corrupt.

Therefore, it is desirable to devise an image-taking methodology that substantially eliminates the time smear problem associated with prior art image mechanisms. To that end, it is desirable to obtain a time-wise consistent image of the entire file system in a distributed file processing environment. It is also desirable to simultaneously store multiple images online and to delete any image without affecting the content or availability of other images stored in the system.

SUMMARY

In one embodiment, the present invention contemplates a method of initiating a system-wide file system image in an object-based distributed data storage system. The method comprises providing a plurality of management entities (or realm managers) each of which maintains a record representing a configuration of a portion (which may include some part or all) of the data storage system; and using a Distributed Consensus Algorithm (DCA) to elect one of the plurality of management entities to serve as an image master to coordinate execution of the system-wide file system image.

In another embodiment, the present invention contemplates a method of achieving a quiescent state in a storage system having a plurality of object-based secure disks and a plurality of executable client applications, wherein each client application, upon execution, is configured to access one or more of the plurality of object-based secure disks. The method comprises defining a plurality of capabilities required to perform a data write operation on corresponding one or more of the plurality of object-based secure disks; granting one or more of the plurality of capabilities to each of the plurality of client applications; and invalidating each of the plurality of capabilities so long as the quiescent state is to be maintained, thereby preventing each client application from accessing one or more of corresponding object-based secure disks to perform the data write operation thereon during the quiescent state.

Upon receiving a request for a system-wide file system image, the image master establishes a quiescent state in the realm, thereby preparing the realm for the image. After the realm is quiesced, the system-wide image is performed, according to one embodiment of the present invention, by cloning each live object group stored in the data storage system without cloning any object contained in each such object group; and thereafter responding to the request for the system-wide file system image. In responding to the image request, the image master may create an image directory in the root object to record image-related information therein, thereby making the image accessible to other applications in the system.

In a still further embodiment, the present invention contemplates a method of performing a system-wide file system image wherein, in addition to quiescing the object-based data storage system in response to the request for the image, the method further includes placing a dummy image directory in the root directory object after receiving the request for the image. The method also includes informing each file manager in the data storage system about a timing of the system-wide file system image, indicating completion of the system-wide file system image; and configuring a file manager to copy an object managed thereby prior to authorizing a write operation to the object after the completion of the system-wide file system image. At the completion of the image, the image master converts the dummy image directory into a final image directory, indicating that the image directory now represents a valid image.

In one embodiment, the system-wide file system image is performed without updating any directory objects stored in the object-based data storage system during image-taking. The directory objects are also not updated after the completion of the image-taking. Neither the object group cloning operation nor the object copying operation update any directory object in the system. The correspondence between live directory objects and image objects is also established without updating the live directory objects to provide such correspondence.

In a still further embodiment, the present invention contemplates a method of avoiding a need to rewrite metadata for an object, stored by a storage manager on one of the plurality of object-based secure disks, when a file system image is taken. The method comprises obtaining information identifying the file system image; using the image identifying information, dynamically obtaining a mapping of a non-image identity of each object group appearing in a file path for the object into a corresponding identity of each object group in the file system image; and for each object group in the file path for the object, dynamically substituting corresponding identity in the file system image in place of respective non-image identity therefor when accessing a version of the object in the file system image. Thus, in order to traverse the image domain, the client obtains the mapping and performs the substitution step—both at run time—when doing the path name resolution in the image domain.

The image methodology according to the present invention allows taking system-wide file system images without time smear and without the need to pre-schedule the images (because of the implementation of capability invalidation). Further, there is no hard limit on the number of images that can be simultaneously kept on line. The images are performed without a significant overhead on system I/O operations. Because no directory objects are updated either during or after the image, the failure-handling procedures in the system are also simplified.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings:

FIG. 12 shows a three-level storage configuration for objects stored in the object-based data storage systems in FIGS. 1 and 2;

FIG. 13 shows a simplified illustration of how the live and cloned object groups are contained in a storage manager;

FIG. 14 illustrates an exemplary set of steps carried out in an object group-based mapping scheme to access a specific live file object; and FIG. 15 illustrates an exemplary mapping according to one embodiment of the present invention when a client application accesses an object in an image.

DETAILED DESCRIPTION

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical data storage systems or networks.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment.

Figure 1:
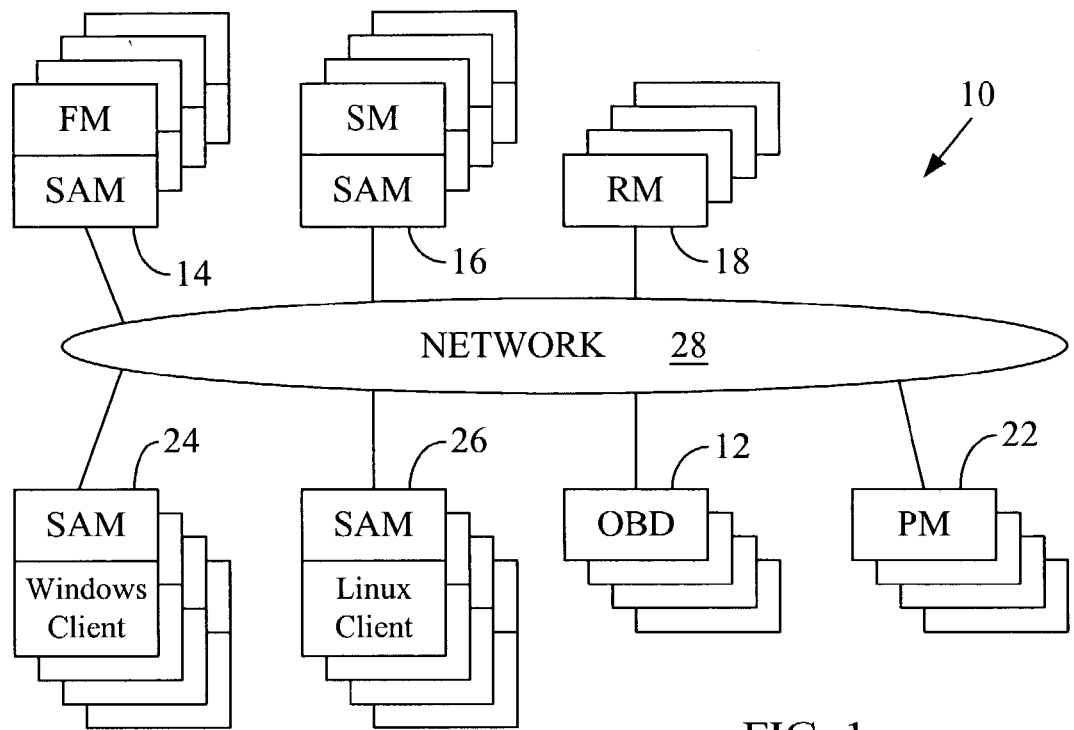
FIG. 1 illustrates an exemplary network-based file storage system designed around Object Based Secure Disks (OBSDs or OBDs)

FIG. 1 illustrates an exemplary network-based file storage system 10 designed around Object Based Secure Disks (OBSDs or OBDs) 12. The file storage system 10 is implemented via a combination of hardware and software units and generally consists of managers 14, 16, 18, and 22, OBDs 12, and clients 24, 26. It is noted that FIG. 1 illustrates multiple clients, OBDs, and managers—i.e., the network entities—operating in the network environment. However, for the ease of discussion, a single reference numeral is used to refer to such entity either individually or collectively depending on the context of reference. For example, the reference numeral "12" is used to refer to just one OBD or a group of OBDs depending on the context of discussion. Similarly, the reference numerals 14–22 for various managers are used interchangeably to also refer to respective servers for those managers. For example, the reference numeral "14" is used to interchangeably refer to the software file managers (FM) and also to their respective servers depending on the context. It is noted that each manager is an application program code or software running on a corresponding server. The server functionality may be implemented with a combination of hardware and operating software. For example, each server in FIG. 1 may be a Windows NT® server. Thus, the file system 10 in FIG. 1 is an object-based distributed data storage system implemented in a client-server configuration.

The network 28 may be a LAN (Local Area Network), WAN (Wide Area Network), MAN (Metropolitan Area Network), SAN (Storage Area Network), wireless LAN, or any other suitable data communication network including a TCP/IP (Transmission Control Protocol/Internet Protocol) based network (e.g., the Internet). A client 24, 26 may be any computer (e.g., a personal computer or a workstation) electrically attached to the network 28 and running appropriate operating system software as well as client application software designed for the system 10. FIG. 1 illustrates a group of clients or client computers 24 running on Microsoft Windows® operating system, whereas another group of clients 26 are running on the Linux® operating system. The clients 24, 26 thus present an operating system-integrated file system interface. The semantics of the host operating system (e.g., Windows®, Linux®, etc.) may preferably be maintained by the file system clients.

The manager (or server) and client portions of the program code may be written in C, C++, or in any other compiled or interpreted language suitably selected. The client and manager software modules may be designed using standard software tools including, for example, compilers, linkers, assemblers, loaders, bug tracking systems, memory debugging systems, etc.

In one embodiment, the manager software and program codes running on the clients may be designed without knowledge of a specific network topology. In that case, the software routines may be executed in any given network environment, imparting software portability and flexibility in storage system designs. However, it is noted that a given network topology may be considered to optimize the performance of the software applications running on it. This may be achieved without necessarily designing the software exclusively tailored to a particular network configuration.

FIG. 1 shows a number of OBDs 12 attached to the network 28. An OBSD or OBD 12 is a physical disk drive that stores data files in the network-based system 10 and may have the following properties: (1) it presents an object-oriented interface rather than a sector-based interface (wherein each "block" on a disk contains a number of data "sectors") as is available with traditional magnetic or optical data storage disks (e.g., a typical computer hard drive); (2) it attaches to a network (e.g., the network 28) rather than to a data bus or a backplane (i.e., the OBDs 12 may be considered as first-class network citizens); and (3) it enforces a security model to prevent unauthorized access to data stored thereon.

The fundamental abstraction exported by an OBD 12 is that of an "object," which may be defined as a variably-sized ordered collection of bits. Contrary to the prior art block-based storage disks, OBDs do not export a sector interface (which guides the storage disk head to read or write a particular sector on the disk) at all during normal operation. Objects on an OBD can be created, removed, written, read, appended to, etc. OBDs do not make any information about particular disk geometry visible, and implement all layout optimizations internally, utilizing lower-level information than can be provided through an OBD's direct interface with the network 28. In one embodiment, each data file and each file directory in the file system 10 are stored using one or more OBD objects.

In a traditional networked storage system, a data storage device, such as a hard disk, is associated with a particular server or a particular server having a particular backup server. Thus, access to the data storage device is available only through the server associated with that data storage device. A client processor desiring access to the data storage device would, therefore, access the associated server through the network and the server would access the data storage device as requested by the client.

On the other hand, in the system 10 illustrated in FIG. 1, each OBD 12 communicates directly with clients 24, 26 on the network 28, possibly through routers and/or bridges. The OBDs, clients, managers, etc., may be considered as "nodes" on the network 28. In system 10, no assumption needs to be made about the network topology (as noted hereinbefore) except that each node should be able to contact every other node in the system. The servers (e.g., servers 14, 16, 18, etc.) in the network 28 merely enable and facilitate data transfers between clients and OBDs, but the servers do not normally implement such transfers.

In one embodiment, the OBDs 12 themselves support a security model that allows for privacy (i.e., assurance that data cannot be eavesdropped while in flight between a client and an OBD), authenticity (i.e., assurance of the identity of the sender of a command), and integrity (i.e., assurance that in-flight data cannot be tampered with). This security model may be capability-based. A manager grants a client the right to access the data storage (in one or more OBDs) by issuing to it a "capability." Thus, a capability is a token that can be granted to a client by a manager and then presented to an OBD to authorize service. Clients may not create their own capabilities (this can be assured by using known cryptographic techniques), but rather receive them from managers and pass them along to the OBDs.

A capability is simply a description of allowed operations. A capability may be a set of bits (1's and 0's) placed in a predetermined order. The bit configuration for a capability may specify the operations for which that capability is valid. Thus, there may be a "read capability," a "write capability," a "set-attribute capability," etc. Every command sent to an OBD may need to be accompanied by a valid capability of the appropriate type. A manager may produce a capability and then digitally sign it using a cryptographic key that is known to both the manager and the appropriate OBD, but unknown to the client. The client will submit the capability with its command to the OBD, which can then verify the signature using its copy of the key, and thereby confirm that the capability came from an authorized manager (one who knows the key) and that it has not been tampered with in flight. An OBD may itself use cryptographic techniques to confirm the validity of a capability and reject all commands that fail security checks. Thus, capabilities may be cryptographically "sealed" using "keys" known only to one or more of the managers 14–22 and the OBDs 12. In one embodiment, only the realm managers 18 may ultimately compute the keys for capabilities and issue the keys to other managers (e.g., the file managers 14) requesting them. A client may return the capability to the manager issuing it or discard the capability when the task associated with that capability is over.

A capability may also contain a field called the Authorization Status (AS), which can be used to revoke or temporarily disable a capability that has been granted to a client. Every object stored on an OBD may have an associated set of attributes, where the AS is also stored. Some of the major attributes for an object include: (1) a device_ID identifying, for example, the OBD storing that object and the file and storage managers managing that object; (2) an object-group_ID identifying the object group containing the object in question; and (3) an object_ID containing a number randomly generated (e.g., by a storage manager) to identify the object in question. If the AS contained in a capability does not exactly match the AS stored with the object, then the OBD may reject the access associated with that capability. A capability may be a "single-range" capability that contains a byte range over which it is valid and an expiration time. The client may be typically allowed to use a capability as many times as it likes during the lifetime of the capability. Alternatively, there may be a "valid exactly once" capability.

It is noted that in order to construct a capability (read, write, or any other type), the FM or SM may need to know the value of the AS field (the Authorization Status field) as stored in the object's attributes. If the FM or SM does not have these attributes cached from a previous operation, it will issue a GetAttr ("Get Attributes") command to the necessary OBD(s) to retrieve the attributes. The OBDs may, in response, send the attributes to the FM or SM requesting them. The FM or SM may then issue the appropriate capability.

Logically speaking, various system "agents" (i.e., the clients 24, 26, the managers 14–22 and the OBDs 12) are independently-operating network entities. Day-to-day services related to individual files and directories are provided by file managers (FM) 14. The file manager 14 is responsible for all file- and directory-specific states. The file manager 14 creates, deletes and sets attributes on entities (i.e., files or directories) on clients' behalf. When clients want to access other entities on the network 28, the file manager performs the semantic portion of the security work—i.e., authenticating the requester and authorizing the access—and issuing capabilities to the clients. File managers 14 may be configured singly (i.e., having a single point of failure) or in failover configurations (e.g., machine B tracking machine A's state and if machine A fails, then taking over the administration of machine A's responsibilities until machine A is restored to service).

The primary responsibility of a storage manager (SM) 16 is the aggregation of OBDs for performance and fault tolerance. A system administrator (e.g., a human operator or software) may choose any layout or aggregation scheme for a particular object. The SM 16 may also serve capabilities allowing clients to perform their own I/O to aggregate objects (which allows a direct flow of data between an OBD and a client). The storage manager 16 may also determine exactly how each object will be laid out—i.e., on what OBD or OBDs that object will be stored, whether the object will be mirrored, striped, parity-protected, etc. This distinguishes a "virtual object" from a "physical object". One virtual object (e.g., a file or a directory object) may be spanned over, for example, three physical objects (i.e., OBDs).

The storage access module (SAM) is a program code module that may be compiled into the managers as well as the clients. The SAM generates and sequences the OBD-level operations necessary to implement system-level I/O operations, for both simple and aggregate objects. A performance manager 22 may run on a server that is separate from the servers for other managers (as shown, for example, in FIG. 1) and may be responsible for monitoring the performance of the file system realm and for tuning the locations of objects in the system to improve performance. The program codes for managers typically communicate with one another via RPC (Remote Procedure Call) even if all the managers reside on the same node (as, for example, in the configuration in FIG. 2).

A further discussion of various managers shown in FIG. 1 (and FIG. 2) and the interaction among them is provided on pages 11–15 in the co-pending, commonly-owned U.S. patent application Ser. No. 10/109, 998, filed on Mar. 29, 2002, titled "Data File Migration from a Mirrored RAID to a Non-Mirrored XOR-Based RAID Without Rewriting the Data", whose disclosure at pages 11–15 is incorporated by reference herein in its entirety.

The installation of the manager and client software to interact with OBDs 12 and perform object-based data storage in the file system 10 may be called a "realm." The realm may vary in size, and the managers and client software may be designed to scale to the desired installation size (large or small). A realm manager 18 is responsible for all realm-global states. That is, all states that are global to a realm state are tracked by realm managers 18. A realm manager 18 maintains global parameters, notions of what other managers are operating or have failed, and provides support for up/down state transitions for other managers. Realm managers 18 keep such information as realm-wide file system configuration, and the identity of the file manager 14 responsible for the root of the realm's file namespace. A state kept by a realm manager may be replicated across all realm managers in the system 10, and may be retrieved by querying any one of those realm managers 18 at any time. Updates to such a state may only proceed when all realm managers that are currently functional agree. The replication of a realm manager's state across all realm managers allows making realm infrastructure services arbitrarily fault tolerant—i.e., any service can be replicated across multiple machines to avoid downtime due to machine crashes.

The realm manager 18 identifies which managers in a network contain the location information for any particular data set. The realm manager assigns a primary manager (from the group of other managers in the system 10) which is responsible for identifying all such mapping needs for each data set. The realm manager also assigns one or more backup managers (also from the group of other managers in the system) that also track and retain the location information for each data set. Thus, upon failure of a primary manager, the realm manager 18 may instruct the client 24, 26 to find the location data for a data set through a backup manager.

Figure 2:
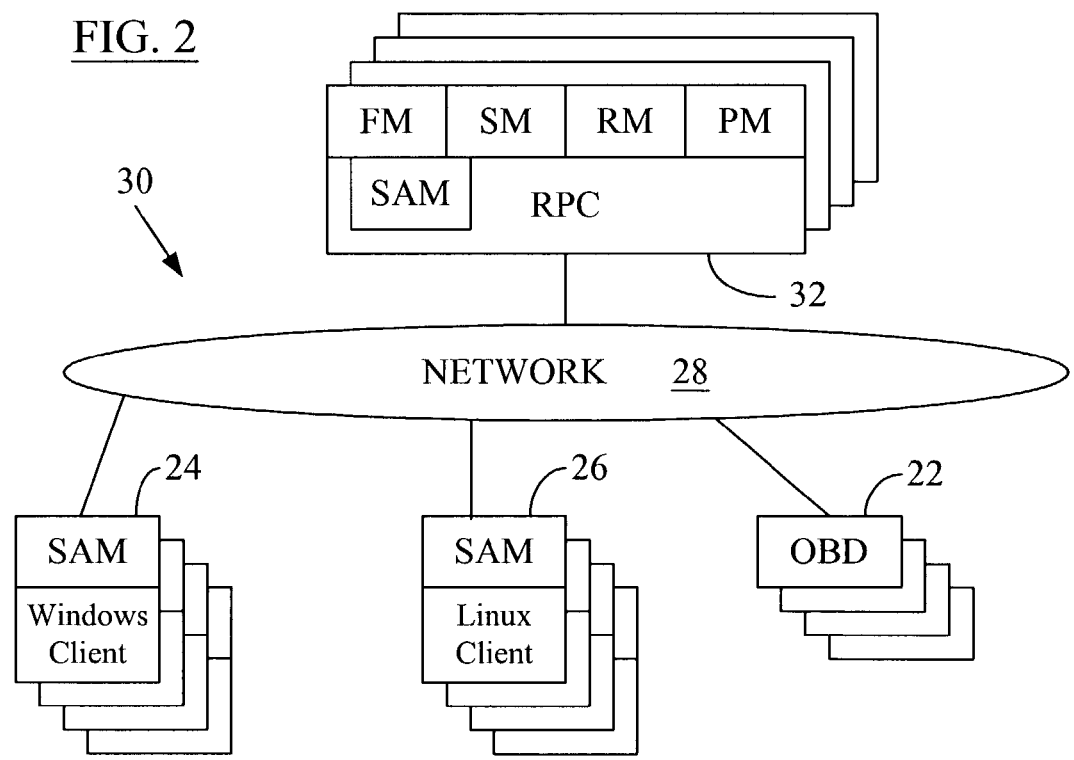
FIG. 2 illustrates an implementation where various managers shown individually in FIG. 1 are combined in a single binary file.

FIG. 2 illustrates one implementation 30 where various managers shown individually in FIG. 1 are combined in a single binary file 32. FIG. 2 also shows the combined file available on a number of servers 32. In the embodiment shown in FIG. 2, various managers shown individually in FIG. 1 are replaced by a single manager software or executable file that can perform all the functions of each individual file manager, storage manager, etc. It is noted that all the discussion given hereinabove and later hereinbelow with reference to the file storage system 10 in FIG. 1 equally applies to the file storage system embodiment 30 illustrated in FIG. 2. Therefore, additional reference to the configuration in FIG. 2 is omitted throughout the discussion, unless necessary.

Generally, the clients may directly read and write data, and may also directly read metadata. The managers, on the other hand, may directly read and write metadata. Metadata may include file object attributes as well as directory object contents. The managers may create other objects in which they can store additional metadata, but these manager-created objects may not be exposed directly to clients.

The fact that clients directly access OBDs, rather than going through a server, makes I/O operations in the object-based file systems 10, 30 different from other file systems. In one embodiment, prior to accessing any data or metadata, a client must obtain (1) the identity of the OBD on which the data resides and the object number within that OBD, and (2) a capability valid on that OBD allowing the access. Clients learn of the location of objects by directly reading and parsing directory objects located on the OBD(s) identified. Clients obtain capabilities by sending explicit requests to file managers 14. The client includes with each such request its authentication information as provided by the local authentication system. The file manager 14 may perform a number of checks (e.g., whether the client is permitted to access the OBD, whether the client has previously misbehaved or "abused" the system, etc.) prior to granting capabilities. If the checks are successful, the FM 14 may grant requested capabilities to the client, which can then directly access the OBD in question or a portion thereof.

Capabilities may have an expiration time, in which case clients are allowed to cache and re-use them as they see fit. Therefore, a client need not request a capability from the file manager for each and every I/O operation. Often, a client may explicitly release a set of capabilities to the file manager (for example, before the capabilities' expiration time) by issuing a Write Done command. There may be certain operations that clients may not be allowed to perform. In those cases, clients simply invoke the command for a restricted operation via an RPC (Remote Procedure Call) to the file manager 14, or sometimes to the storage manager 16, and the responsible manager then issues the requested command to the OBD in question.

Figure 3:
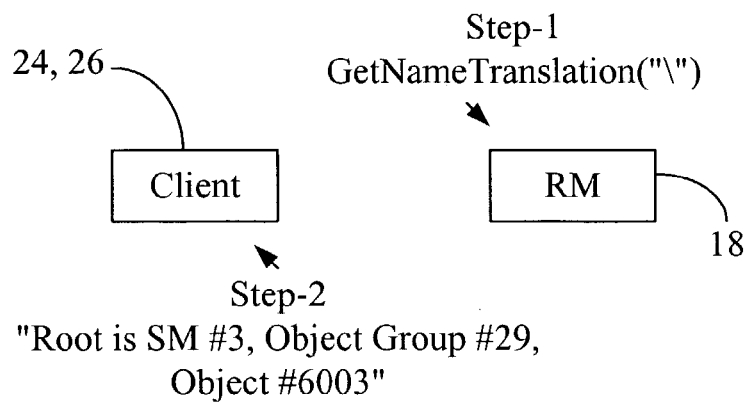
FIG. 3 is a simplified diagram of the process when a client first establishes a contact with the data file storage system according to the present invention.

FIG. 3 is a simplified diagram of the process when a client 24, 26 first establishes a contact with the data file storage system 10, 30 according to the present invention. At client setup time (i.e., when a client is first connected to the network 28), a utility (or discovery) program may be used to configure the client with the address of at least one realm manager 18 associated with that client. The configuration software or utility program may use default software installation utilities for a given operating system (e.g., the Windows® installers, Linux® RPM files, etc.). A client wishing to access the file storage system 10, 30 for the first time may send a message to the realm manager 18 (whose address is provided to the client) requesting the location of the root directory of the client's realm. A "Get Name Translation" command may be used by the client to request and obtain this information as shown by step-1 in FIG. 3. The contacted RM may send the requested root directory information to the client as given under step-2 in FIG. 3. In the example shown in FIG. 3, the root information identifies the triplet {device_ID, object-group_ID, object_ID}, which is {SM #3, object-group #29, object #6003}. The client may then contact the FM identified in the information received from the RM (as part of that RM's response for the request for root directory information) to begin resolving path names. The client may probably also acquire more information (e.g., the addresses of all realm managers, etc.) before it begins accessing files to/from OBDs.

After the client establishes the initial contact with the file storage system 10, 30—i.e., after the client is "recognized" by the system 10, 30—the client may initiate a data file write operation to one or more OBDs 12.

In one embodiment, all files and directories in the storage system 10, 30 may exist in an acyclic single-rooted file name space (i.e., a single file name space). In that embodiment, clients may be allowed to mount the entire tree or a single-rooted subtree. Clients may also be allowed to mount multiple subtrees through multiple mount commands. The software for the storage system 10, 30 may be designed to provide support for a single, universal file name space. That is, a file name that works on one client should work on all clients in the system, even on those clients that are logically operating at disparate geographic locations. Under the single, global namespace environment, the file system abstraction that is exported to a client is one seamless tree of directories and files.

As discussed hereinbelow, a fully distributed file system-image solution according to the present invention allows managers to interact among themselves to produce a system-wide image without time smear. In the object-based distributed file system 10, there is no single centralized point of control. Therefore, a system-wide image is handled by a "parliament" of controllers (i.e., realm managers 18 as discussed immediately below) because the image-taking affects the entire realm. However, because such system-wide control involves many steps and because the "voting" (discussed below) or communication among realm managers may consume system resources and time, it is desirable to configure realm managers to choose amongst themselves one realm manager or image master that is responsible to coordinate system-wide image activity in the realm. In one embodiment, if such image master fails, then the entire image is declared failed.

Figure 4:
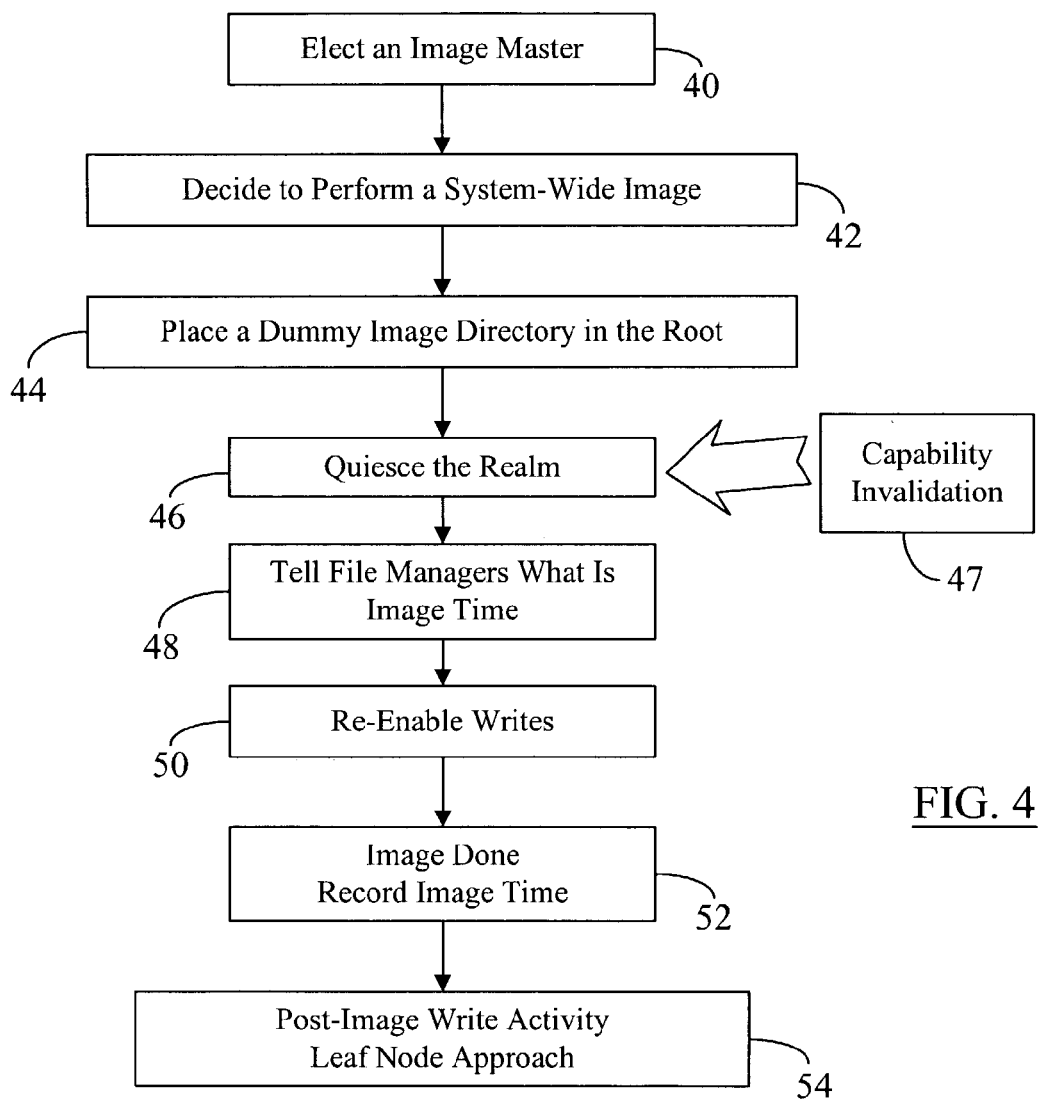
FIG. 4 illustrates an exemplary flowchart of steps involved in performing a system-wide image according to one embodiment of the present invention in the distributed object-based data storage systems shown in FIGS. 1 and 2.

FIG. 4 illustrates an exemplary flowchart of steps involved in performing a system-wide image according to one embodiment of the present invention in the distributed object-based data storage systems 10, 30 shown in FIGS. 1 and 2 respectively. At any time, the realm managers 18 in the system 10 (reference to the system 30 in FIG. 2 is omitted for the sake of brevity only) elect one of them to act as an image master to manage the image-taking operation (block 40, FIG. 4). In one embodiment, the image master is elected at system boot time. The election of image master may be performed using the well-known Distributed Consensus Algorithm (DCA) (also known as Quorum/Consensus Algorithm). A more detailed discussion of DCA is provided in "The Part-Time Parliament" by Leslie Lamport, Digital Equipment Corporation, Sep. 1, 1989, which is incorporated herein by reference in its entirety. The DCA implements a Part Time Parliament (PTP) model in which one node (here, the realm manager acting as the image master) acts as a president, whereas other nodes (i.e., other realm managers) act as voters/witnesses. The nodes communicate with one another using this PTP model. The president issues "decrees" to voters who, in turn, determine whether the president's action is appropriate—this is known as the "voting phase." The voters then send a message back to the president indicating whether or not they approve the president's action—this is known as the "Success" or "Failure" phase. If each node approves the president's decree, then the president informs all the nodes that the decree has passed.

The elected image master remains a master until it fails or is taken out of service or the system shuts down. The remaining RMs detect the absence of the image master via "heartbeats" (a type of internal messaging in the PTP model), which causes them to perform a quorum/consensus-based election of a new image master. Also, if an image master discovers that it is not in communication with a quorum of realm managers, it abdicates its position and informs other RMs of that action. The RMs may again elect another image master using DCA. Thus, at any time, there is at most one image master in the realm, and there is no master if there is no quorum of realm managers. When there is no quorum of realm managers, the entire realm is either in a failed state, or is transitioning to or from a failed state. For example, in a realm with five realm managers, the no-quorum condition arises when at least three of those managers fail simultaneously. It is noted here that the choice of the method of electing an image master (e.g., the PTP model or any other suitable method) is independent of the desired system fault tolerance.

Figure 5:
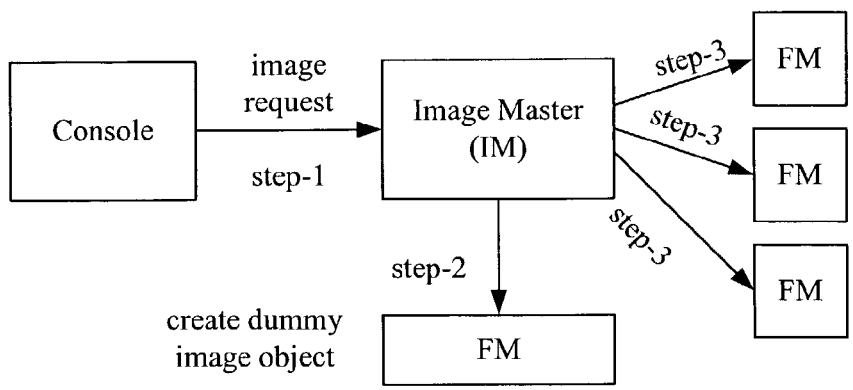
FIG. 5 illustrates creation of a dummy image directory during the image request phase in the image process shown in FIG. 4.

The image taking process can be automated, in which case, the system-wide image may be taken automatically at a predetermined time or after a predetermined time period has elapsed. On the other hand, the image may be taken manually when desired. In order to take an image (block 42, FIG. 4), a system administrator (software or human operator) running a system management console on a trusted client or manager first sends an authorized image request to the image master (step-1 in FIG. 5). The image may be requested by sending an RPC command to the image master RM. After performing authentication and permission checks, and checking that the file system is not in a failure condition that would preclude taking the image, the image master places/writes a dummy image directory in the root object for the file system through appropriate file manager (block 44, FIG. 4; step-2, FIG. 5), indicating that the image is under way. The master then sends image requests to all file managers 14 in the system 10, informing them of the image (step-3, FIG. 5). These pre-image events are depicted through steps 1–3 (which are self-explanatory) in FIG. 5.

Figure 6:
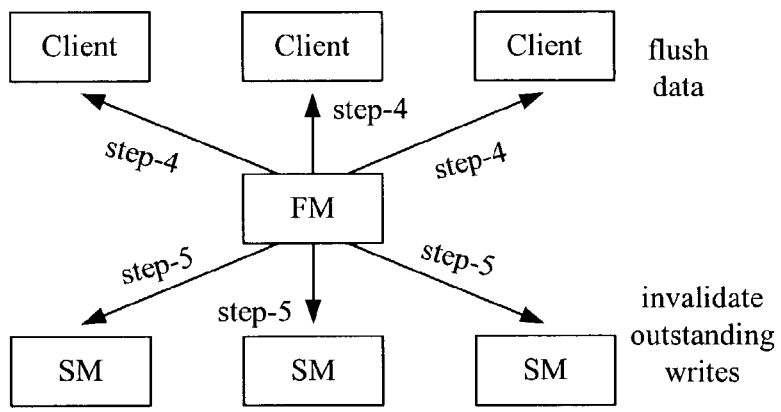
FIG. 6 shows quiescent phase-related events in the image process in FIG. 4.

In response to the image request from the image master, each FM 14 stops issuing new write capabilities (i.e., queues all incoming requests for capabilities). This begins the phase to quiesce the realm or to achieve a quiescent state in the realm (block 46, FIG. 4) to obtain a system-wide image with minimum time smear. It is desirable to quiesce write activity in the file system 10 to ensure that there is a consistent state to capture (i.e., to obtain an internally-consistent image). In the realm quiescing phase, each FM 14 scans its list of outstanding write capabilities and sends a message to each client 24, 26 holding such capabilities. The message requests that the client finish any in-flight writes and then flush corresponding data (step-4, FIG. 6). The FM also stops issuing new write capabilities to clients. When a client has finished all in-flight writes, it flushes corresponding data and responds to the FM (step-4, FIG. 6). When the FM has received a response from all clients, or after a fixed delay regardless of client responses, the FM invalidates all outstanding write capabilities by issuing invalidation commands to the storage managers 16 upon which that FM has outstanding write capabilities (block 47, FIG. 4; step-5, FIG. 6). This is to assure that the image is immutable, even when malicious or misbehaving clients re-use their capabilities after being requested to discard them. The FM can, however, make a note of any client that fails to respond in time. The FM may be configured to choose any technique for accomplishing the capability invalidations including, for example, changing the cryptographic key for a capability, or sending a bulk-invalidate command to all SM's 16 in the system 10, or sending a series of single invalidation commands to each individual SM, etc. Upon completion of the invalidation task, each SM responds to the FM (step-5, FIG. 6) that it has completed the requested invalidations. These quiescent phase-related events are depicted through steps 4–5 (which are self-explanatory) in FIG. 6. It is noted that read capabilities need not be invalidated during image-taking because a read operation is generally not destructive. Further, the capability invalidation may be performed in the realm to prepare the system 10 for orderly shutdown or to repair a damaged volume on an OBD 12.

Figure 7:
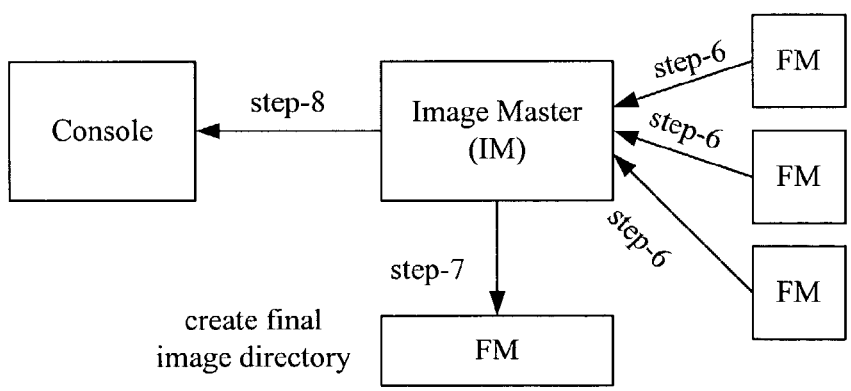
FIG. 7 depicts the reply phase-related events in the image process in FIG. 4.

Each FM then responds to the image master that it has completed its image work (step-6, FIG. 7). When the image master receives a response from all the file managers, it informs each file manager what the image time is (block 48, FIG. 4). It is noted that when all outstanding write capabilities have been invalidated (i.e., when each FM receives a response from all necessary SM's), the FM makes a permanent record (by updating its internal state) that, from its own perspective, the image has happened. At this point the FM is free to start issuing write capabilities again (block 50, FIG. 4). After receiving the response from all the file managers, the image master also converts or updates (through appropriate file manager) the dummy object in the root into a final image directory via which the image can be accessed (step-7, FIG. 7), indicating that the image directory now represents a valid image. In one embodiment, the image master also makes available in this image directory object the time at which the image was taken, the logical name for the image (which may be supplied, for example, by the client requesting the image), and the image version number. Thereafter, the image master informs the file managers 14 and the storage managers 16 in the system 10 that they may resume activity and may also include in this message the timestamp that it recorded for this new image (block 52, FIG. 4). Because each file manager and each storage manager in the system 10 receives the identical time for the image, the problem of time smear is avoided. The image master also responds to the image requesting console (step-8, FIG. 7) indicating completion of the system-wide image-taking operation (block 52, FIG. 4). FIG. 7 graphically depicts steps 6–8 involved in the "reply phase" during an image in the system 10. Based on the discussion above, the steps shown in FIG. 7 are self-explanatory.

In one embodiment, instead of quiescing the write activity in the file system 10 at an arbitrary time, the realm-wide images may be scheduled in advance so that the realm managers can inform corresponding file managers and storage managers that they must prepare to quiesce at the prearranged time. In that case, file managers 14 and storage managers 16 will track the time of the next upcoming image and will ensure that all capabilities they issue expire at or before the time of the image. Such an approach enables the system to minimize the time required to interfere with a large number of outstanding I/O operations in order to accomplish write capability invalidations for establishing the quiescent state. By synchronizing clocks of all file managers 14 in the system 10, the file managers can be made to quiesce simultaneously or within a couple of seconds of clock skew.

Even though it is shown at block 50 in FIG. 4 that a file manager can start issuing write capabilities to clients at that point in the image process, it is noted that because of the requirement for recursive images (described in more detail hereinbelow with reference to block 54 in FIG. 4), that file manager may have to wait until all file managers in the system 10 have reported back (to the image master) that they are quiescent. A file manager attempting to issue write capabilities prior to the point at which all other FMs have quieted their write activity may encounter the dummy object at the file system root, rather than the final image directory (created at step-7 in FIG. 7).

Once taken, an image becomes visible in the realm-wide file name space via a new directory that appears at the root of the file system. As noted before, the system administrator creating the image may be allowed to specify a name for the image, which appears in the root object as the image directory name. For example, the administrator may choose to name an image by its image version number, or by the time at which it was taken. Thus, the image of a file named "/xyz.com/a/b/c" may appear as "/xyz.com/image_1/a/b/c" or as "xyz.com/image_July_15_2002_04:00/a/b/c".

The foregoing describes a process of taking a system-wide image in the distributed object-based data storage system 10 in FIG. 1 (or system 30 in FIG. 2, as noted before). Block 52 in FIG. 4 marks the end of actions taken at the time of an actual image. In order that the image be immutable, all subsequent file system write operations must cause the object being written to be duplicated into the image directory because the image directory at block 52 (FIG. 4) is just an image of the root object directory, with all directory entries in the image copy pointing to the entries in the "live" file tree. In other words, the "image tree" still does not contain images or copies of all system files as of the time the image was taken. Therefore, appropriate "leaf nodes" in the image tree representing duplicate versions of corresponding objects in the live tree must be "built" prior to allowing any write activity on a particular object. This recursive image approach is discussed below with reference to FIGS. 8 and 9.

Figure 8:
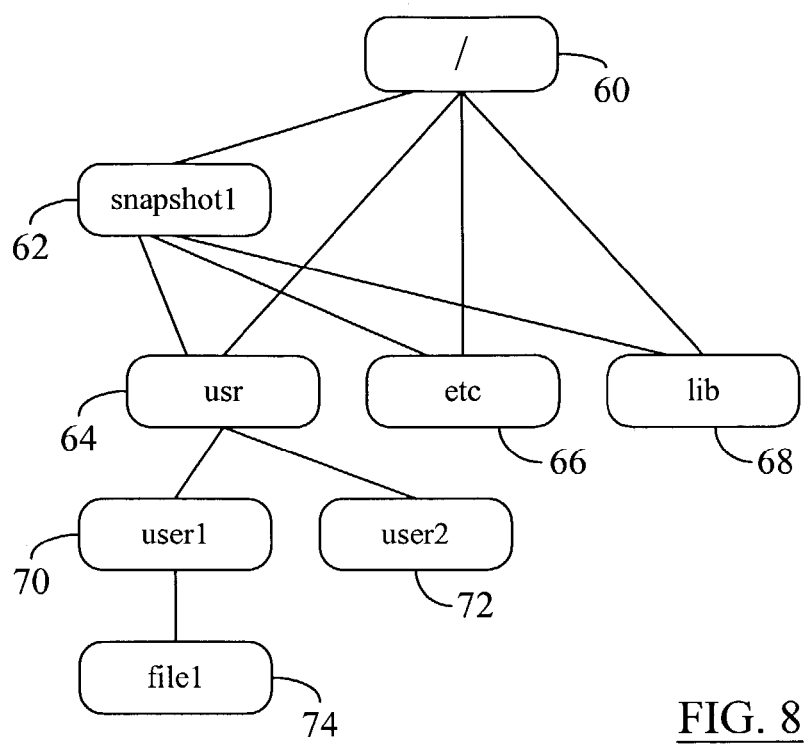
FIG. 8 illustrates an exemplary tree structure with files and directories in the live tree and an image tree immediately after an image is taken according to the image process shown in FIG. 4.

As noted before, all files and directories in the storage system 10, 30 may exist in an acyclic single-rooted file name space (i.e., a single file name space for the entire realm). FIG. 8 illustrates an exemplary tree structure with files and directories in the live tree and an image tree immediately after an image is taken. A "live tree" contains all files and directories active in the system 10, 30; whereas, an "image tree" contains just an image or copy of the files and directories in the system at a particular instant in time (e.g., the image time identified at block 52 in FIG. 4). In other words, the files in the live tree are "active" and their contents may constantly change in the normal course of data storage operations, whereas the contents of files in the image tree never change—i.e., the files in the image tree are "frozen" as of the time of image-taking. Each file object and directory object in the system may be represented as a "leaf node" in the appropriate tree. For example, in FIG. 8, the live tree is composed of leaf nodes 64, 66, 68, 70, 72 and 74; whereas the image tree is composed of the leaf node 62. The common root is represented by numeral 60. As can be seen from the tree representation in FIG. 8, all directory entries in the image tree are pointing to entries in the live tree immediately after the image has been taken. Therefore, all post-image file system write operations must first cause the object being written to be duplicated into the file-system image to "construct" the image tree prior to proceeding with modifying the content of that object through a write operation. In other words, file and directory objects that have not been updated since the previous image will be visible in the image name space, but the links there will refer back to the live copy in the "live tree."

The following describes the recursive image process in one embodiment of the present invention arising from post-image write activity (block 54, FIG. 4). A file manager 14 detects a post-image write operation when it receives a request (e.g., from a client 24, 26) for a write capability. When an FM 14 receives a request for a write capability, the FM 14 checks the image version number attached to the "live" object to be written into against the latest image version number that the FM 14 holds in its own stable state. If the two image version numbers do not match, then prior to issuing the write capability, the FM 14 may issue a copy-on-write (FastCopy) command against that live object on the OBD 12 where the object is stored. As part of the FastCopy command, the FM 14 may supply the {object-group_ID, object_ID} values for the live object to be copied and also for the image of the copied object. It is noted that the image version number may be attached to a live object either at the time the object was created or at the time when that object was last updated after an image.

In the exemplary tree structure of FIG. 8, when a client requests a new write capability for the file file1, the FM 14 responsible for file1 object 74 will first perform the image version number comparison. Since an image has just occurred (as indicated by image1 node 62 in FIG. 8), the current image version number will be different from that attached to the live file1 object 74, indicating that the file1 object 74 requires a FastCopy operation before the FM 14 can issue any write capabilities against it. The FastCopy operation causes a storage manager 16 managing the OBD 12 containing file1 to instruct that OBD 12 to take a logical copy of the live file1 object 74 and create a new object (file1 object 75) with a new object_ID (which may be randomly generated by the storage manager). It is noted that each object stored in the system 10, 30 may have a unique object_ID assigned to it by the storage manager 16 storing it. For example, the object_ID for the live file1 object 74 may be "1011", whereas the object_ID for the image of file1 object (object 75) may be "2358."

The FM 14 then records the new object_ID in a directory entry in the image of the directory that contains the original object (here, file1 object 74). This implies that the FM 14 must first create the image of the parent directory (user1 directory 70) for the file1 object 74, which in turn may imply a recursive traversal up several directory layers until the FM reaches a directory that (a) is owned by another file manager, (b) is the root of the file system (e.g., the root object 60 in FIG. 8), or (c) has already been modified since the last image was taken. In case of event (a), the FM initiating the recursive traversal must request the other file manager to take over and continue the recursive image of the directories along the path to the root, and wait for this other file manager to complete before continuing further. In cases (b) and (c), the FM initiating the recursive traversal has completed its path-image run and can now issue new write capabilities against the file in question. Thus, the traversal for recursive images of each directory upward in the live tree is depth-first (leaf node by leaf node), meaning that an FM recurses to the parent before taking the image of the child.

Figure 9:
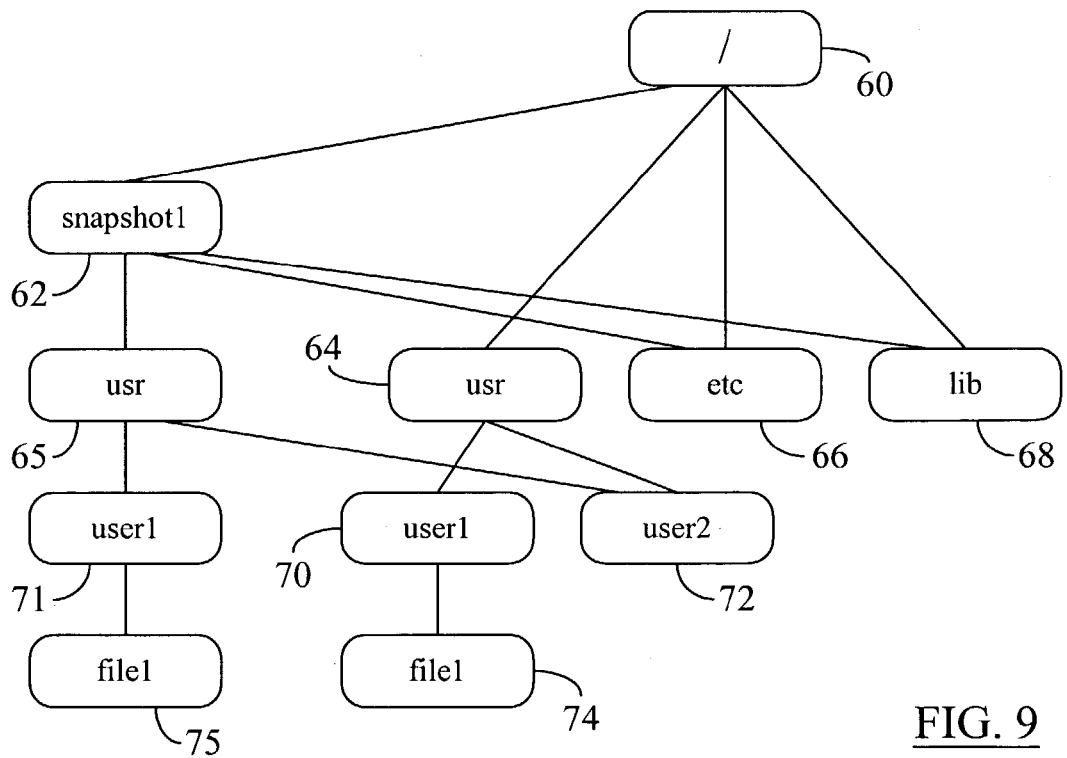
FIG. 9 shows an image tree constructed in a distributed object-based data storage system using the leaf node approach.

The following describes an exemplary set of steps that a file manager follows during a recursive image process to effect the change from the tree structure in FIG. 8 to that in FIG. 9, which illustrates an image tree constructed in a distributed object-based data storage system using the leaf node approach:

1. The file manager ("FM1") receiving a request for write capability on file1 object 74 first issues a GetAttr ("Get Attribute") command on the OBD 12 storing file1 object 74 to obtain the image version number attached to it.
2. Upon realizing that a FastCopy is needed for file1 object 74, FM1 recurses to the parent directory (user1 object 70). This may cause FM1 to fetch the attributes for user1 object 70 (using, for example, the GetAttr command).
3. FM1 then recurses to the parent of user1 70, which is usr 64. FM1 does a GetAttr on usr 64 and discovers that usr 64 is controlled by another file manager ("FM2"). FM1 has now reached the point where it cannot recurse further, so FM1 invokes an RPC on FM2 requesting that FM2 continue the directory image process farther up the live tree.

4. FM2 wishes to image usr 64 and therefore fetches its attributes. In doing so, FM2 recurses to the parent, which is the root object "/" 60.

5. FM2, having reached the root object 60, fetches the image object "/image1" 62 and confirms that it is a valid image (and not a dummy object created at the initiation of an image). The FM2 now begins the process of taking directory images back down along its recursion tree. The FM2 issues a FastCopy operation against usr 64, and replaces the directory entry in image1 62 to point to the image of usr 64 (i.e., usr 65). This causes FM2 to reach the bottom of its recursion stack, and so it returns a "Success" indication to FM1.

6. FM1, having received confirmation that the tree above it has been processed for image, is now able to image its own directories. FM1 resolves the path name "/image1/usr" to identify the directory object in the image tree that it wishes to update. In that regard, FM1 issues a FastCopy operation against user1 70 and then issues an RPC to FM2 (distinct from the RPC in step 3 above), asking FM2 to replace the user1 directory 70 entry in "/image1/usr" with the new object_ID created by the FastCopy (or image) of user1 70 (i.e., user1 71). Continuing down its recursion stack, FM1 then images file1 74, and installs a new directory entry (i.e., file1 75) in "/image1/usr/user1."

7. This completes the image process for file1 74 and FM1 is now free to issue write capabilities against file1 74.

It is noted that if a file manager (FM1, FM2 or any other file manager 14) now wishes to create a new file (through a write operation) in the directory user2 72, the recursion chain will reach only as high as usr 64 because usr directory 64 has already been installed in the image tree (indicated as usr 65), and, hence, there is no reason to recurse higher.

In one embodiment, at the time of the FastCopy operation, the FM initiating the FastCopy operation updates the image version number attached to the "live" object prior to issuing the write capability against that object. This assures that the next time that file manager receives a request for a write capability against that object, a FastCopy operation may not be needed because the object would have been marked as already having been updated in the most recent image.

Figure 10:
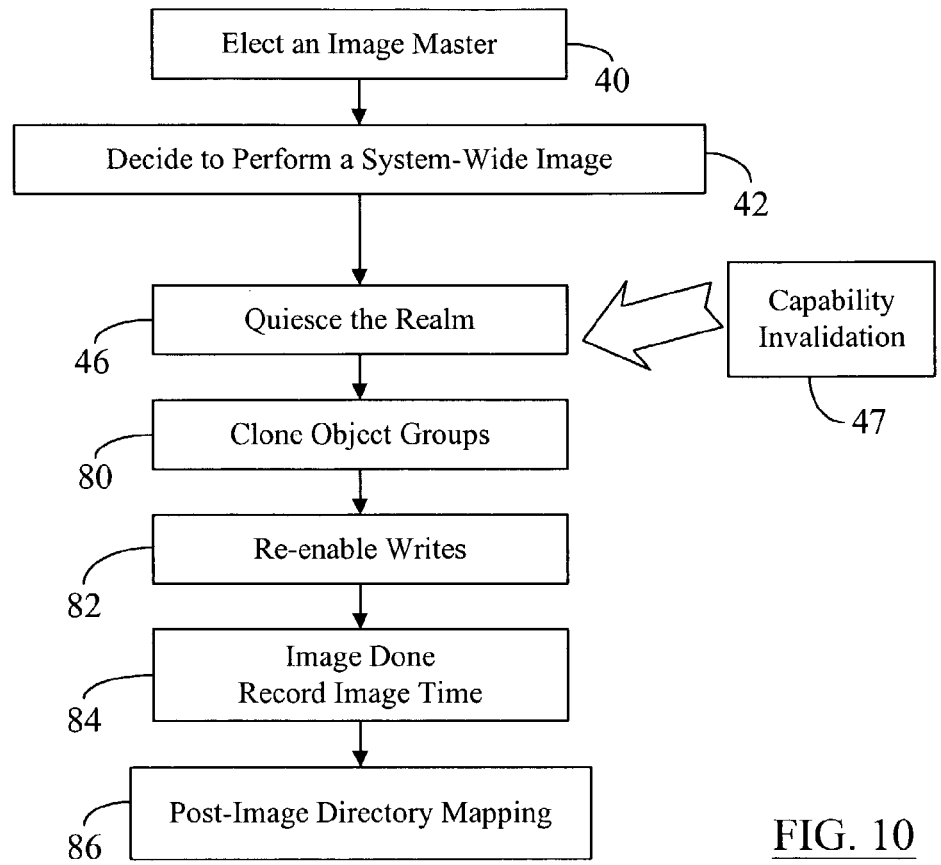
FIG. 10 illustrates an exemplary flowchart of steps involved in performing a system-wide image according to another embodiment of the present invention.
Figure 11:
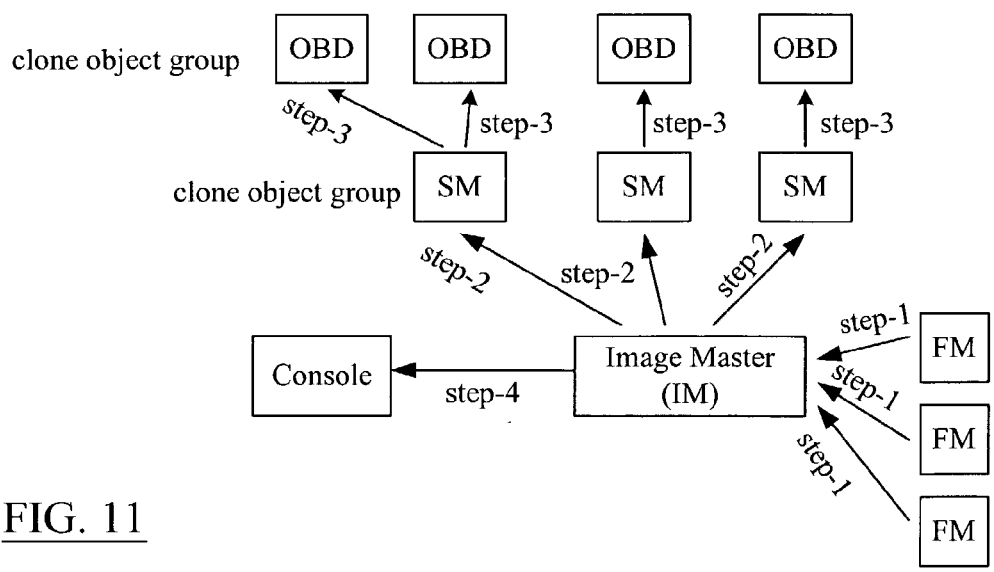
FIG. 11 depicts the reply phase-related events in the image process in FIG. 10.

FIG. 10 illustrates an exemplary flowchart of steps involved in performing a system-wide image according to another embodiment of the present invention. Blocks 40–47 shown in FIG. 10 are identical to those shown in FIG. 4 (with block 44 in FIG. 4 absent from the embodiment in FIG. 10) and, hence, a discussion of the steps described by those blocks is not repeated here for the sake of brevity. It is noted that the discussion given earlier with reference to FIGS. 5 and 6 equally applies to corresponding blocks in FIG. 10 (except for the discussion related to step-2 in FIG. 5 because of the absence of creation of a dummy image object in the embodiment shown in FIG. 10), and, hence, that discussion is also not repeated here. However, the sequence of events shown in FIG. 7 does not completely apply to the embodiment described through FIG. 10. Therefore, a modified version of FIG. 7 is shown in FIG. 11, which depicts the reply phase-related events in the image process in FIG. 10. As shown at step-1 in FIG. 11, when each FM has received a response from all necessary SM's that write capabilities are invalidated and the realm is quiesced (blocks 46, 47 in FIGS. 4 and 10), that FM responds to the image master (IM) that the system is quiet and ready for the image.

When the IM receives a response from all file managers, it issues a Clone Object Group command to each SM in the system 10, 30, for each live object group that each SM contains or manages (block 80, FIG. 10; step-2, FIG. 11). In one embodiment, there may be only one object group for each SM. In another embodiment, there may be more than one object group for one or more of the storage managers. The Clone Object Group command is similar to the FastCopy command, except that the Clone Object Group command uses only the {object-group_ID} values for the live and cloned object groups (instead of the pair of {object-group_ID, object_ID} values taken by the FastCopy command) and returns the results as a status indication ("success" or "fail"). It is noted that in the absence of an image, the object group(s) is called a "live" object group. An image of that live object group generates an image object group. In that case, there are two object groups for the corresponding SM—one live object group and one image object group. That storage manager may span (or store) a virtual object group over more than one physical storage disk or OBDs 12.

In the system 10 in FIG. 1 (or the system 30 in FIG. 2), the storage configuration may be organized in three levels as illustrated in FIG. 12. Each higher level may be considered as a "container" for the next lower one. Thus, a device (e.g., a storage manager 16 or an OBD 12) may contain one or more object groups, with each object group containing one or more objects, as illustrated in FIG. 12. However, it is noted that some devices may not contain any object group. Further, each entity in the storage hierarchy in FIG. 12 may have an ID assigned to it to easily identify that entity during data storage and image operations as discussed later. It is noted that, in one embodiment, each {device_ID, object-group_ID, object_ID} triplet must be unique in the realm. In other words, even if two objects have the same object_ID, they cannot have the same values for the corresponding {device_ID, object-group_ID, object_ID} triplet.

It is noted that the cloning operation is performed on a live object group and generates an image object group as a result. As illustrated in FIG. 11, upon receiving the Clone Object Group command from the IM, each storage manager duplicates object group header information (that includes the cloned object-group_ID, image_ID, and cloned object group attributes as discussed hereinbelow) for all of its local (live) object groups and marks the indicated object group(s) as copy-on-write. Then the storage manager issues corresponding Clone Object Group commands to each OBD that the storage manager uses (illustrated at step-3 in FIG. 11). In response to the Clone Object Group command, each OBD takes a logical copy of an object group and creates a new (image) object group with a new object-group_ID (which may be randomly generated). Thereafter, each OBD reports the object-group_ID of each newly-created object group back to the corresponding storage manager, and that storage manager, in turn, records the new object-group_ID and identity of the respective OBD containing the new object group in its internal data structures. Each SM then reports the object-group_IDs of the newly-created SM-level object groups back to the image master, which, in turn, records the new object-group_IDs in an image-group_ID table maintained by the image master.

FIG. 13 shows a simplified illustration of how the live and cloned object groups are contained in a storage manager. As depicted in FIG. 13, two live object groups, A and B, are initially managed by the storage manager 16 before any image activity in the system. Thereafter, the storage manager 16 may receive a first Clone Object Group command and, in response, generate the first cloned object group A'. Next, the storage manager 16 receives a second Clone Object Group command to generate the second cloned object group B'. Thus, each object group is cloned one at a time, without the storage manager 16 knowing that a global image operation is taking place in the system. At the end of the first image operation, therefore, four object groups (A, A', B, and B') exist on the storage manager 16 in FIG. 13. During a second image operation in the system, the storage manager 16 does not clone the existing four object groups (i.e., object groups A, A', B, and B'), but only clones the two live objects groups contained therein. That is, during a second, later occurring image, the storage manager 16 clones only object groups A and B to generate the corresponding cloned object groups A" and B" respectively as shown in FIG. 13.

Thus, at the storage manager level, according to the present invention, each object group in the system 10 is cloned—none after another—without primarily or explicitly focusing on cloning, one by one, each object in the system 10. An individual object is therefore not the focus of the cloning operation by the storage manager; it is not addressed (by the storage manager) during the cloning. Individual objects are copied later as needed (copy-on-write), for example, when the first write operation is requested in the system after the image-taking operation is over. On the other hand, the leaf node approach discussed with reference to block 54 in FIG. 4 is an example of object-by-object copying scheme. It is noted that an object group, as discussed herein, is a flat name space; an object group has objects as members. There is no correlation between the file directory hierarchy (e.g., as shown in the file structure trees shown in FIGS. 8 and 9) in the file name space and the object groups. An image of an object group may contain an image of a random distribution of unrelated member objects. Whereas, an image of a file directory contains an image of those objects that are related to one another (and are nodes on the file tree).

Each object group in the system 10 may have properties or attributes associated therewith. Each attribute is a {parameter, value} pair, i.e., each attribute constitutes a parameter and its value. For example, one set of parameters includes image_time, image_name (a logical name given by the image requestor or user), and clone_source. These parameters allow a manager (e.g., a realm manager 18) to identify which image an object is part of. With reference to FIG. 13, for example, the original (live) object group may have the following attributes: image_time=0 (i.e., t=0), image_name=blank (i.e., no name because of the live object status), and clone_source=0 (i.e., no clone source because of the live object status). On the other hand, the attributes for the cloned object group A' may be: image_time=2:00 p.m., image_name=daily.2 pm.Jun. 12, 2002, and clone_source=A (because A' is cloned from the live object group A). Similarly, the attributes for the cloned object group A" include the same value for the clone_source parameter, but different values for the image_time and image_name parameters. In the event of a failure in the system 10, each storage manager 16 may be asked (e.g., by a new image master elected after the system is restarted) to produce a list of its object groups and their attributes, and the system may be rebuilt from the time of failure by examining the attribute values.

The attributes of each object group stay with the corresponding storage manager 16. However, each realm manager 18 may keep a copy of each object group attributes for indexing purpose. This is desirable to improve system performance when a user or a client 24, 26 asks a realm manager 18 for a permission to access specific files in an image. Without such information pre-available to the realm manager 18, the realm manager 18 may have to contact each relevant storage manager 16 to obtain a list of all relevant object groups and their attributes, thereby increasing network traffic and system overhead. This can be avoided when the realm manager is provided with an index of object groups and their attributes.

Each storage manager 16 may continue accumulating object group images (clones) until it runs out of the actual, physical storage space (on a corresponding OBD 12) that is holding the system-wide file system image. During image-taking, because each object group is indicated as copy-on-write, only a small number of bytes may be needed to store the image-related information that includes values for the cloned object-group_ID, image_ID and cloned object group's attributes for each object group cloned by the respective storage manager. In one embodiment, each OBD 12 supports a 32-bit ID for an object group, which allows a creation and storage of a large number (theoretically $2^{32}-2$ (to exclude the ID for the object group to be cloned and the ID with all zeros)) of cloned object groups. All the object groups contained in a storage manager may have different, randomly-generated, object-group_ID. However, it may be possible that two object groups on different storage managers have the same object-group_ID.

The cloning of each object group results in creation of copies of object group header information without copying the objects contained in an object group. Because an object group in an image is made a copy-on-write entity, the constraints placed on the system architecture by the system-wide image are minimized because of the avoidance of copying the entire object group (with all its constituent objects) during image-taking.

Referring now to FIG. 10, upon successful completion of cloning of each object group (block 80, FIG. 10), the image master informs the file managers 14 that they are free to start issuing write capabilities again (block 82, FIG. 10). In one embodiment, the image master also stores an image-descriptor object or directory in the root (indicating a valid image) and makes available in this image-descriptor object the time at which the image was taken, the logical name for the image (which may be supplied, for example, by the client requesting the image), and the image version number (or image_ID). In any event, the image master informs the file managers 14 and the storage managers 16 in the system 10 that they may resume activity and also includes in this message the timestamp that it recorded for this new image (block 84, FIG. 10). As noted before, because each file manager and each storage manager in the system 10 receives the identical time for the image, the problem of time smear is avoided. The image master also responds to the image requesting console (step-4, FIG. 11) indicating completion of the system-wide image-taking operation (block 84, FIG. 10).

As part of re-enabling the write operations (block 82, FIG. 10), the image master may generate a new value for each capability "key" and send that new value to respective file manager 14. The file managers 14 may then start issuing new capabilities with these new keys. On the other hand, in an alternate embodiment, the image master may instead instruct the file managers 14 to start issuing new capabilities with the original "key" values, i.e., the key values prior to image-taking. In another embodiment, the image master may issue each key with embedded information about the state of the realm and for what operations the file manager 14 can use the key. It is noted that the realm managers 18 may employ the distributed consensus algorithm (DCA) to authorize the image master to change the key values because the activity of changing keys requires participation of all the realm managers who need to know the new key values in the event that there is a system failure and the realm managers need to communicate with one another to rebuild the system. Without the most recent key values available to them, the realm managers may not be able to communicate with their clients.

However, it may not be desirable to change the key values to something different from the original because of a possibility of creation of a system bottleneck when many clients having new capabilities different from the original ones start accessing their respective file managers to inform that their capabilities are no longer valid. But, if the original keys are re-enabled, then the original capabilities start working again and in the case of a client's request for an invalid capability, the corresponding file manager just has to respond by saying that "retry with your old capability." Another advantage of keeping the original key values is that the image-taking activity becomes transparent to the clients. In other words, if a client's write operation or data access is briefly interrupted by the system-wide image-taking, the client does not need to be aware of image-taking. It may simply retry the interrupted operation with the original capability, which is already active after system-wide image-taking (which lasts for a very short time).

It is noted that the operation of cloning the object groups (block 80, FIG. 10) does not involve the use of the distributed consensus algorithm (DCA). That operation is performed by the image master alone. However, when the image master fails before the image is completely over (block 84, FIG. 10), then the realm managers may again use the DCA upon system re-start to elect another image master who deletes the partially created image by instructing all storage managers to remove the partial image information stored thereon. The new image master sends the image_ID of the failed image to each storage manager and instructs the storage manager to delete all object groups contained in the image having the failed image's image_ID.

After a system-wide file system image is taken, any future write requests to an object are entertained by first performing an object-copying operation (for the object to be written), if it has not already been done, at the target OBD (copy-on-write) prior to issuing any write capability on the object to be written. In other words, such copying operation is implicit in the copy-on-write requirement.

According to the present invention, when a client 24, 26 wishes to access an object contained in a system-wide image (as opposed to a live object), the client 24, 26 may perform a directory mapping (discussed below) to access the image version of the live object. Prior to discussing such mapping, it is apt to describe how a client may access a live object in an environment that is object group-based as opposed to a system that is file directory-based (e.g., the embodiment discussed hereinabove with reference to FIGS. 4 and 8–9). As discussed before, in the file directory-based system, a client may traverse the live tree (or the image tree) to access a specific node or file. In the present object group-based embodiment, the file path naming may still remain the same, but the way of accessing an object differs.

FIG. 14 illustrates an exemplary set of steps carried out in an object group-based mapping scheme to access a specific live file object. As shown in FIG. 14, the file path for the object "c.doc" may be given, for example, as "/a/b/c.doc", where the first slash (/) points at the system root directory. In other words, in the file name space, there is a root directory and a number of other file directories emanating from the root in the live (or image) tree. In the system 10 in FIG. 1 (or the system 30 in FIG. 2), each directory object (including the root) on an OBD may contain a section for header information and another section for entries. The entries for a directory may include a field for names and a field for corresponding identifiers. An identifier may include the values for the entire {device_ID, object-group_ID, object_ID} triplet as illustrated and discussed with reference to FIG. 15 below. However, for the ease of discussion, only the object_ID values are shown for the identifier fields in FIG. 14. For example, as shown in FIG. 14, the root directory object may contain an entry having the name "a" and the identifier as number "37." The number "37" may be the object_ID pointing to the next component in the path name (here, the component with name "b"). The client reaches the root directory by querying the appropriate realm manager 18 who, in turn, indicates that the root object has object_ID=3 as shown in FIG. 14. The initial name resolution to obtain root object identity is discussed hereinbefore with reference to FIG. 3.

The client 24, 26 may identify the object "c.doc" as an object with the path name "/a/b/c.doc." Therefore, after locating the root object, the client 24, 26 may locate an entry with name "a" and read the associated identifier. Here, that identifier is "37", which is pointing to the next component in the path name. Upon reading the object having object_ID=37, the client may find a directory entry having the name "b" (as that is the name the client wishes to reach during its file path name resolution) and associated identifier=53. Upon further accessing the object with object_ID=53, the client may locate an entry having the name "c.doc" and associated identifier 12. The client finally accesses the object "c.doc" when it accesses the object having object_ID=12.

The above process of locating an object applies to a live object whose file path traverses a live tree. In the event that a client 24, 26 wishes to access an object whose file path lies on an image tree, a modified version of the above name resolution process is performed according to the present invention. For example, a client application may name an object in an image using some specially defined path name (e.g., /image/a/b/c.doc), but the actual naming convention is not relevant to the mapping scheme described below with reference to FIG. 15. What is necessary is that the client be able to identify the triplet {device_ID, object-group_ID, object_ID} for each component in the file path.

FIG. 15 illustrates an exemplary mapping (block 86, FIG. 10) when a client application accesses an object in an image. The mapping in FIG. 15 is illustrated in a table form for ease of discussion only. It is noted that the actual data corresponding to the entries in the table in FIG. 15 may not be stored in such a table form on respective OBDs. In the exemplary mapping shown in FIG. 15, the client 24, 26 is assumed to attempt to access the object "/image/a/b/c.doc" in the image domain. The client 24, 26 first obtains the object_ID for the root object as discussed above and also with reference to FIG. 3. The client also obtains the image_ID (for example, image_ID=S) for the image of interest from the image descriptor object or image pseudo-directory created in the root directory object in the system. Upon initially accessing the root object (with object_ID=3 in the present example), the client 24, 26 encounters the triplet {α, A, 3} corresponding to the parameters {device_ID, object-group_ID, object_ID}. That is, the root object has device_ID=α, object-group_ID=A, and object_ID=3. Using the value for the image_ID (=S), the client 24, 26 queries its realm manager 18 to map the storage manager with device_ID=α and the object group with object-group_ID=A onto the image domain with image_ID=S. That is, the client 24, 26 queries the RM 18 to obtain the mapping of the image_ID to object-group_ID for a given storage manager. The pseudo command for such mapping request and the mapping received from the realm manager 18 may look like: map [(α, A)→S]→(α, A'), where A' is the object-group_ID for the cloned version of the object group with object-group_ID=A.

The client will then continue doing its normal name resolution (discussed above with reference to FIG. 14) to locate the next component in the file path, except that the client will replace the object-group_ID of each live object with the corresponding object-group_ID in the image (S) obtained by querying the RM 18. For example, in FIG. 15, when the client reads the image object in the root (with triplet {α, A', 3}), the client still sees the name "a" at object_ID=3 because the image object is a perfect copy of the original, live object. That is, the image object points to the corresponding live object. Upon reading the triplet values in the live domain for the directory name "a", the client receives the values {α, B, 37}. Again, as the client is interested in accessing the object "c.doc" in the image domain, the client further queries the RM 18 to map the storage manager with device_ID=α and the object group with object-group_ID=B onto the image domain with image_ID=S. The pseudo command for such mapping request and the mapping received from the realm manager 18 may look like: map [(α, B)→S]→(α, B'), where B' is the object-group_ID for the cloned version of the object group with object-group_ID=B. Upon reading the directory entries at object_ID=37, the client locates the name "b" with identifier {(α, C, 53} in the live domain. The client continues the mapping process (shown in FIG. 15) because it knows that it has to locate the "c.doc" object in the image domain. Finally, as the last row in the table in FIG. 15 illustrates, the client queries the RM 18 to map the live object-group_ID=B and device_ID=α to obtain the values (α, B') in the image domain. The client then accesses the image version of the object "c.doc" by replacing the object-group_ID=B with object-group_ID=B' to obtain the triplet {α, B', 12} and then to locate the object with object_ID=12 in the object group with object-group_ID=B' on the storage manager α. In this manner, the client 24, 26 can traverse the path in the image space rather than in the normal, live space. As noted earlier and as can be seen in FIG. 15, two different objects (here, objects "a" and "c.doc") may still have the same object-group_ID (=B).

The above describes a mapping scheme (block 86, FIG. 10) where a client 24, 26 dynamically (i.e., at run time) substitutes image (or cloned) object-group_ID queried from the RM for the object-group_ID found in the (live) directory entries. Because of such dynamic mapping, the re-writing of metadata for each object in an image does not need to be performed when the image is taken. Also, because of the client's ability to establish the correspondence between the live objects and the image objects, the live directory objects are not updated either during or after the image-taking to reflect such correspondence therethrough. In other words, the original (live) directory objects maintain their original object-group_ID's and object_ID's during and after the image. Similarly, no original directory object is updated either during or after the image in the embodiment illustrated in FIG. 4 because, in that embodiment also, no original (or live) object is written (e.g., in the leaf node approach at block 54 in FIG. 4) to maintain the image. Further, in the image mechanisms according to the present invention, there is no static name translation between various object groups. Instead, new ID's for object groups are created randomly. As the original (live) objects are not updated during or after the image, it becomes easier to delete the image versions of objects contained in a partially complete image when an image master fails.

On the other hand, in the prior art systems, one of two approaches are taken during image. In the first approach, the new directory object (created during image) becomes the live object itself and updates the corresponding previous live directory to point to this new object. In the second approach, the new object becomes an image object, in which case it updates the image directory (or directories if there is more than one) to point to this new image object. Thus, in both of these approaches, one or more directories are updated to store the ID of the object newly created during the image.

The foregoing describes various schemes to accomplish a system-wide file system image in a distributed object-based data storage system. In one embodiment, a realm manager in the system is elected using the Distributed Consensus Algorithm to function as an image master to coordinate the image taking process. When the image master receives a request for the image, it prepares the system for image-taking. In one embodiment, the image master quiesces the realm by informing the file managers that an image is under way, and the file managers, in turn, invalidate all write capabilities pending in the system. A client requires a write capability to perform a data write operation on an object-based secure disk (OBD) in the system. The system is quiesced when all pending write capabilities are invalidated. In one embodiment, as part of taking the system-wide image, the image master instructs each storage manager in the system to clone corresponding object groups contained therein, without cloning any objects contained in the object groups. To preserve the image immutability, all objects stored in the system are marked copy-on-write during image-taking. Neither the cloning operation nor the copying operation update any directory object in the system. The correspondence between live directory objects and image objects is also established without updating the live directory objects to provide such correspondence. In a still further embodiment, in order to traverse the image domain, the client, at run time, replaces the non-image identity of each object group in the file path for an object with that object group's image identity received from a realm manager when doing the path name resolution in the image domain. This allows the client to access the image version of the object without the need to rewrite metadata for the object when the image is taken.

It is noted that various managers (e.g., file managers 14, storage managers 16, etc.) shown and described with reference to FIG. 1 (and FIG. 2), the program code implemented to operate the systems in FIGS. 1 and 2, and the program code for performing the system-wide file system image according to an embodiment of the present invention may reside on a computer-readable, tangible storage medium (e.g., a compact disc, an optical disc, a magnetic storage medium such as a computer hard drive, etc.) allowing ease of software portability and system management. The program code on the storage medium can be executed by a computer system and upon execution, the program code performs various operations described hereinabove with reference to individual components constituting the program code. Similarly, a client application (e.g., any of the client applications 24, 26 in FIG. 1) can also be stored on a computer-readable data storage medium and executed therefrom.

The image methodology according to the present invention allows taking system-wide file system images without time smear and without the need to pre-schedule the images (because of the implementation of capability invalidation). Further, there is no hard limit on the number of images that can be kept concurrently on line. The images are performed without a significant overhead on system I/O operations. Because no directory objects are updated either during or after the image, the failure-handling procedures in the system are also simplified.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

The invention claimed is:

1. A method of performing an internally-consistent system-wide file system image in an object-based data storage system comprising:
   receiving a request for said system-wide file system image;
   if said storage system is not in a failure condition, quiescing said object-based data storage system in response to said request for said image;
   cloning each live object group stored in said data storage system after said data storage system is quiesced without individually addressing any object contained in each said object group during said system-wide file system image; and
   responding to said request for said system-wide file system image.

2. The method of claim 1, wherein receiving said request includes:
   electing an image master from a plurality of realm managers in said object-based data storage system, wherein said image master coordinates execution of said system-wide file system image, and wherein each of said plurality of realm managers maintains a record of the system-wide file storage configuration in said object-based data storage system; and
   configuring said image master to receive said request for said system-wide file system image.

3. The method of claim 1, wherein quiescing said data storage system includes:
   instructing each client application running in said object-based data storage system to finish a corresponding data write operation already commenced thereby;
   advising each said client application to discard corresponding one or more write capabilities issued thereto for a future data write operation, wherein each said client application requires a write capability to perform said future data write operation in said data storage system; and
   ceasing issuance of new write capabilities to each said client application.

4. The method of claim 1, wherein quiescing said data storage system includes invalidating each write capability issued to each client application running in said object-based data storage system, wherein each said client application requires a write capability to perform a corresponding data write operation in said object-based data storage system.

5. The method of claim 4, wherein invalidating each said write capability includes:
   identifying a management entity in said data storage system that facilitates said data write operation for each corresponding client application by recognizing each said write capability presented thereto by each said client application; and
   instructing said management entity to stop recognizing each said write capability, thereby preventing each said client application from performing said data write operation in said object-based data storage system.

6. The method of claim 4, wherein invalidating each said write capability includes preventing recognition of each said write capability in said data storage system.

7. The method of claim 1, wherein cloning each said live object group includes:
   providing a plurality of management entities in said data storage system, wherein each of said plurality of management entities is configured to manage data transfer operations within said data storage system, and wherein each of said plurality of management entities contains at least one live object group stored in said data storage system; and
   instructing each of said plurality of management entities to clone corresponding one or more live object groups contained therein.

8. The method of claim 1, wherein cloning each said object group includes:
   creating a corresponding duplicate object group for each said object group; and
   copying respective header information contained in each said object group into said corresponding duplicate object group.

9. The method of claim 8, wherein creating said corresponding duplicate object group includes assigning a corresponding new object group_ID to each said duplicate object group.

10. The method of claim 9, wherein said data storage system includes a plurality of object-based secure disks, wherein assigning said corresponding new object group_ID includes:
    indicating to each object-based secure disk (OBD) in said data storage system that each object group stored thereon is to be cloned;
    supplying said corresponding new object group_ID for each said duplicate object group to each respective OBD in said data storage system; and
    instructing each said OBD to copy each object group stored thereon to create said corresponding duplicate object group identified therefor and assign said corresponding new object group_ID to respective duplicate object group.

11. The method of claim 8, wherein each said object group is cloned into said corresponding duplicate object group without rewriting metadata for one or more objects contained in each said object group.

12. The method of claim 1, wherein responding to said request includes:
    creating an image directory in a root directory object in said object-based data storage system to record therein information related to said system-wide file system image;
    re-enabling one or more data write operations in said data storage system;
    informing each file manager in said data storage system about a timing of said system-wide file system image; and
    indicating completion of said system-wide file system image to an entity in said data storage system that requested said system-wide file system image.

13. The method of claim 12, wherein re-enabling said one or more data write operations includes commencing recognizing each write capability issued to each client application running in said object-based data storage system, wherein each said client application requires a write capability to perform a corresponding data write operation in said object-based data storage system.

14. The method of claim 12, wherein responding to said request further includes recording an image_ID and said timing of said system-wide file system image in said image directory.

15. An object-based data storage system comprising:
means for receiving a request for an internally-consistent system-wide file system image;
means for quiescing said object-based data storage system in response to said request for said image if said storage system is not in a failure condition;
means for cloning each object group stored in said data storage system after said data storage system is quiesced without individually addressing any object contained in each said object group during said system-wide file system image; and
means for responding to said request for said system-wide file system image.

16. A computer-readable storage medium containing a program code, which, upon execution by a processor in an object-based distributed data storage system, causes said processor to perform the following:
receive a request for a system-wide file system image in said data storage system;
quiesce said object-based data storage system in response to said request for said image if said storage system is not in a failure condition;
clone each object group stored in said data storage system after said data storage system is quiesced without individually addressing any object contained in each said object group during said system-wide file system image; and
respond to said request for said system-wide file system image.

17. A method of performing an internally-consistent system-wide file system image in an object-based data storage system comprising:
receiving a request for said system-wide file system image;
placing a dummy image directory in a root directory object in said object-based data storage system;
quiescing said object-based data storage system in response to said request for said image;
informing each file manager in said data storage system about a timing of said system-wide file system image;
indicating completion of said system-wide file system image and converting said dummy image directory into a valid image directory in said root directory object to record therein information related to said system-wide file system image; and
configuring each said file manager to copy each corresponding object managed thereby prior to authorizing a write operation to said object after said completion of said system-wide file system image.

18. The method of claim 17, wherein receiving said request includes:
electing an image master from a plurality of realm managers in said object-based data storage system, wherein said image master coordinates execution of said system-wide file system image, and wherein each of said plurality of realm managers maintains a record of the system-wide file storage configuration in said object-based data storage system; and
configuring said image master to receive said request for said system-wide file system image.

19. The method of claim 17, wherein quiescing said data storage system includes:
instructing each client application running in said object-based data storage system to finish a corresponding data write operation already commenced thereby;
advising each said client application to discard corresponding one or more write capabilities issued thereto for a future data write operation, wherein each said client application requires a write capability to perform said future data write operation in said data storage system; and
ceasing issuance of new write capabilities to each said client application.

20. The method of claim 17, wherein quiescing said data storage system includes invalidating each write capability issued to each client application running in said object-based data storage system, wherein each said client application requires a write capability to perform a corresponding data write operation in said object-based data storage system.

21. The method of claim 20, wherein invalidating each said write capability includes instructing each said file manager to stop recognizing each said write capability, thereby preventing each said client application from performing said corresponding data write operation in said object-based data storage system.

22. The method of claim 20, wherein invalidating each said write capability includes preventing recognition of each said write capability in said data storage system.

23. The method of claim 17, wherein indicating said completion of said system-wide file system image includes indicating said completion to an entity in said data storage system that requested said system-wide file system image.

24. The method of claim 17, further comprising responding to said request for said system-wide file system image.

25. The method of claim 24, wherein responding to said request includes:
re-enabling one or more data write operations in said data storage system.

26. The method of claim 25, wherein responding to said request further includes recording an image_ID and said timing of said system-wide file system image in said valid image directory.

27. The method of claim 25, wherein re-enabling said one or more data write operations includes commencing recognizing each write capability issued to each client application running in said object-based data storage system, wherein each said client application requires a write capability to perform a corresponding data write operation in said object-based data storage system.

28. The method of claim 17, wherein configuring each said file manager to copy each corresponding object includes configuring each said file manager to perform the following:
determine if there is a mismatch between a first image version number contained in said corresponding object and a second image version number of said system-wide file system image;
upon detecting said mismatch, perform an image of each file directory appearing in a file path for said corresponding object until one of the following file directories in said file path is encountered:
said root directory object, and
a file directory whose image already exists for said second image version number;

create a copy of said corresponding object in said image of the file directory containing said corresponding object; and replacing said first image version number contained in said corresponding object with said second image version number prior to authorizing said write operation to said corresponding object.

29. The method of claim 28, wherein configuring each said file manager to perform said image of each said file directory includes configuring each said file manager to duplicate each said file directory appearing in said file path for said corresponding object prior to creating said copy of said corresponding object in said image of the file directory containing said corresponding object.

30. The method of claim 28, wherein configuring each said file manager to create said copy of said corresponding object includes:

configuring each said file manager to create said copy of said corresponding object having a first object_ID that is different from a second object_ID of said corresponding object; and further configuring each said file manager to record said first object_ID of said copy of said corresponding object in said image of the file directory containing said corresponding object.

31. An object-based data storage system comprising:

means for receiving a request for an internally-consistent system-wide file system image;

means for placing a dummy image directory in a root directory object in said object-based data storage system;

means for quiescing said object-based data storage system in response to said request for said image;

means for informing each file manager in said data storage system about a timing of said system-wide file system image;

means for indicating completion of said system-wide file system image and converting said dummy image directory into a valid image directory in said root directory object to record therein information related to said system-wide file system image; and means for configuring a file manager to copy an object managed thereby prior to authorizing a write operation to said object after said completion of said system-wide file system image.

32. A computer-readable storage medium containing a program code, which, upon execution by a processor in an object-based distributed data storage system, causes said processor to perform the following:

receive a request for a system-wide file system image in said object-based data storage system;

place a dummy image directory in a root directory object in said object-based data storage system;

quiesce said object-based data storage system in response to said request for said image;

inform each file manager in said data storage system about a timing of said system-wide file system image;

indicate completion of said system-wide file system image and converting said dummy image directory into a valid image directory in said root directory object to record therein information related to said system-wide file system image; and configure each said file manager to copy each corresponding object managed thereby prior to authorizing a write operation to said object after said completion of said system-wide file system image.

* * * * *